United States Patent [19]

Thomey

[11] Patent Number: 4,723,934

[45] Date of Patent: Feb. 9, 1988

[54] BELT TENSIONER

[75] Inventor: Henry W. Thomey, Windsor, Canada

[73] Assignee: Dyneer Corporation, Westport, Conn.

[21] Appl. No.: 924,437

[22] Filed: Oct. 29, 1986

[51] Int. Cl.⁴ ............................................. F16H 7/12
[52] U.S. Cl. .................................................. 474/135
[58] Field of Search ............... 474/135, 133, 111, 109, 474/101

[56] References Cited

U.S. PATENT DOCUMENTS

| | | | |
|---|---|---|---|
| 4,285,676 | 8/1981 | Kraft | 474/135 |
| 4,472,162 | 9/1984 | Hitchcock | 474/135 |
| 4,473,362 | 9/1984 | Thomey et al. | 474/135 |
| 4,551,120 | 11/1985 | Thomey | 474/135 |
| 4,557,707 | 12/1985 | Thomey | 474/101 |
| 4,557,709 | 12/1985 | St. John | 474/117 |
| 4,583,962 | 4/1986 | Bytzek | 464/133 |
| 4,596,538 | 6/1986 | Henderson | 474/135 |

Primary Examiner—James A. Leppink
Assistant Examiner—Thuy M. Bui
Attorney, Agent, or Firm—Michael Sand Co.

[57] ABSTRACT

A belt tensioning device for engagement with the endless drive belt of a vehicle accessories drive system. A pivot support base is adapted to be mounted on a vehicle engine in a stationary position adjacent the drive belt and has a lever arm assembly pivotally mounted thereon. An idler pulley is mounted on an extended end of the lever arm assembly and is biased into tensioning engagement with the drive belt by a torsional coil spring. An arcuate-shaped plastic bearing strip is located between arcuate surfaces of the pivot support base and an outer cylindrical housing portion of the lever arm assembly and has two distinct bearing surfaces. The lever housing slides on the bearing strip during movement of the lever arm towards and away from the drive belt which provides frictional damping for the lever to reduce undesirable movement of the idler pulley.

26 Claims, 25 Drawing Figures

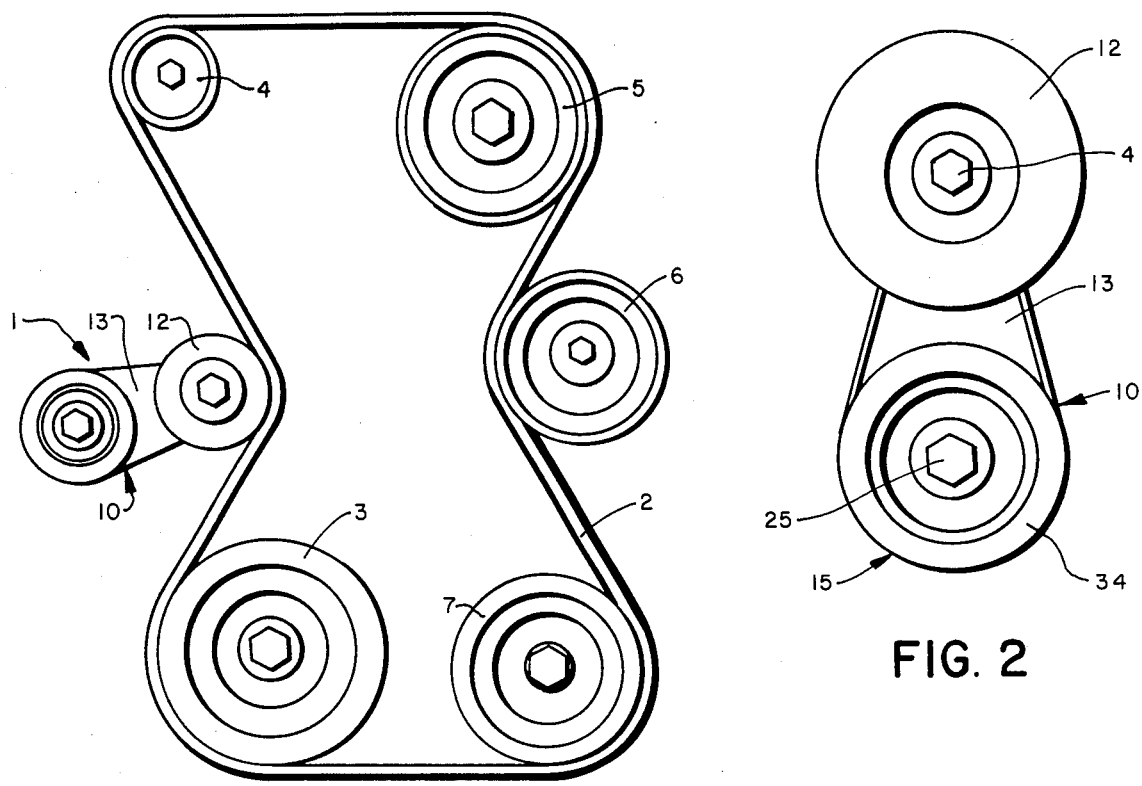
FIG. 1
FIG. 2
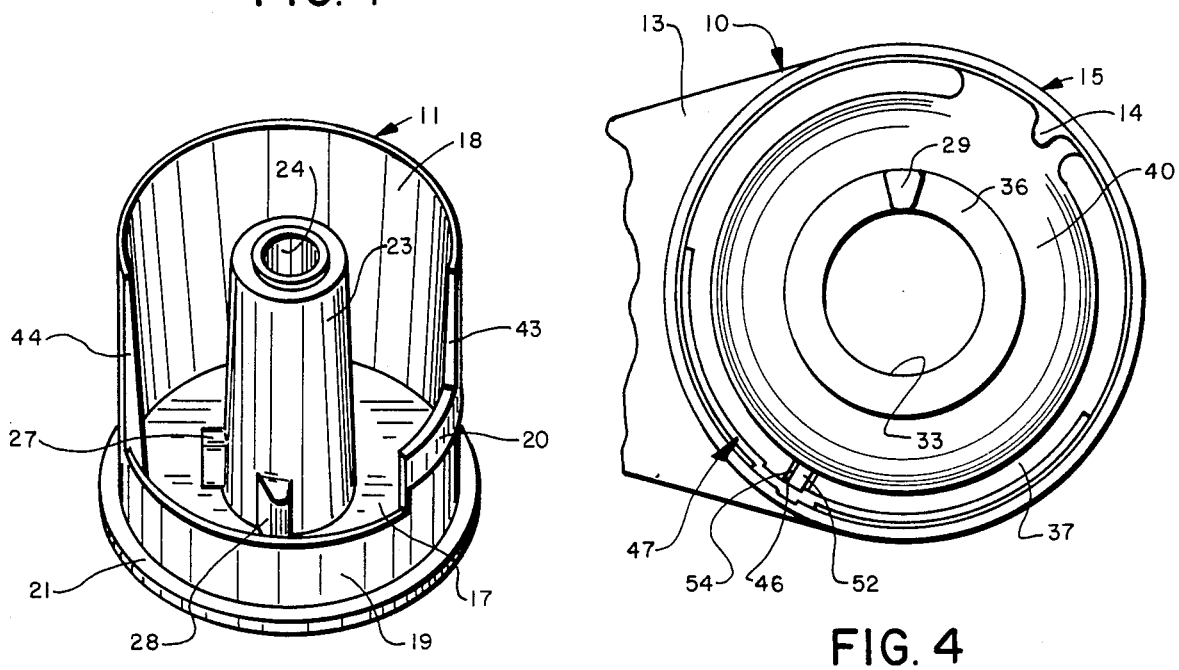
FIG. 3
FIG. 4

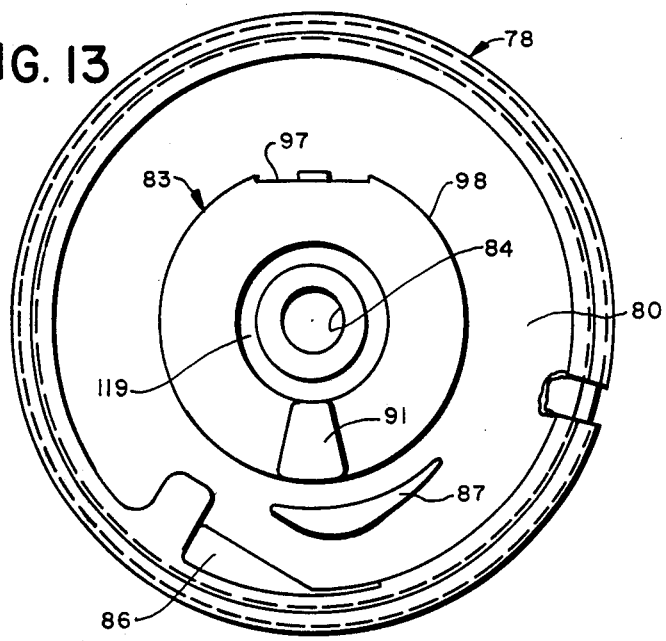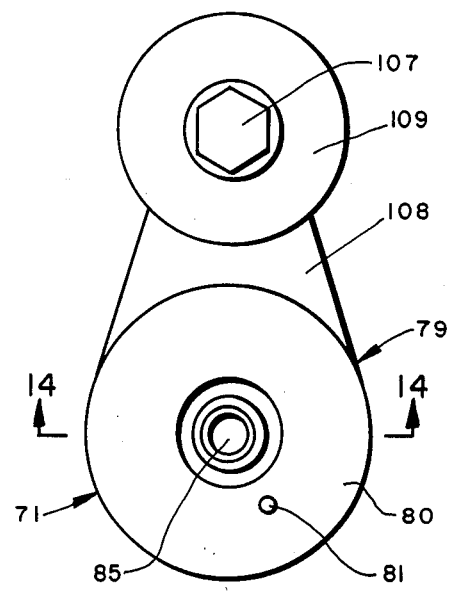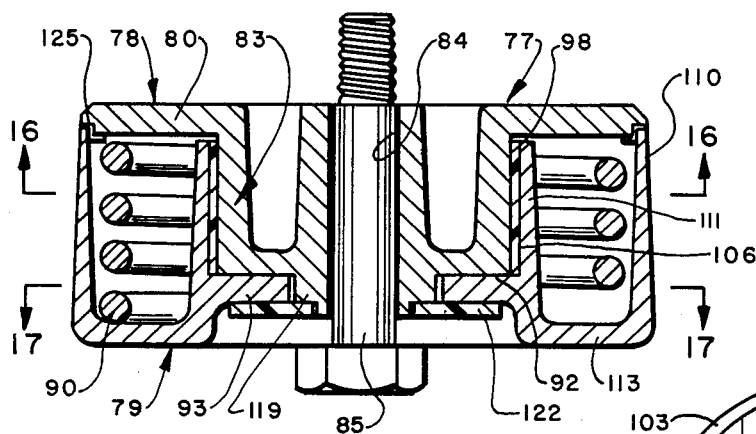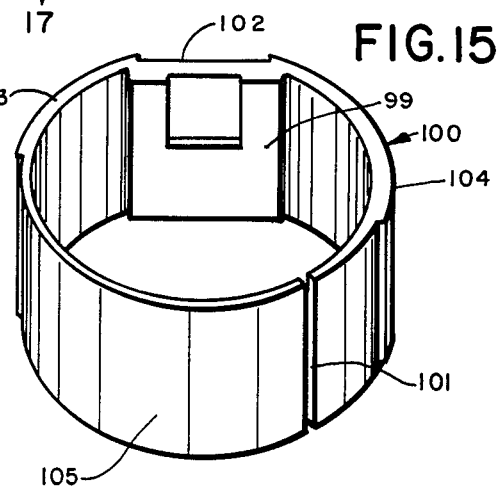

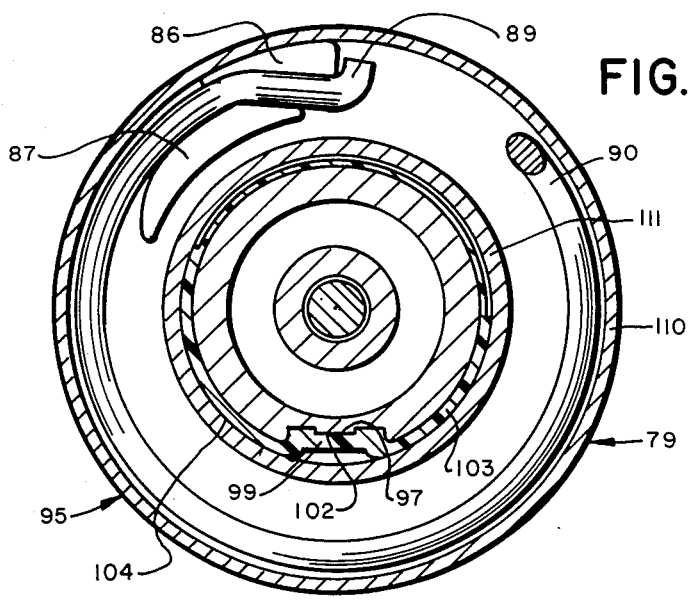
FIG. 16
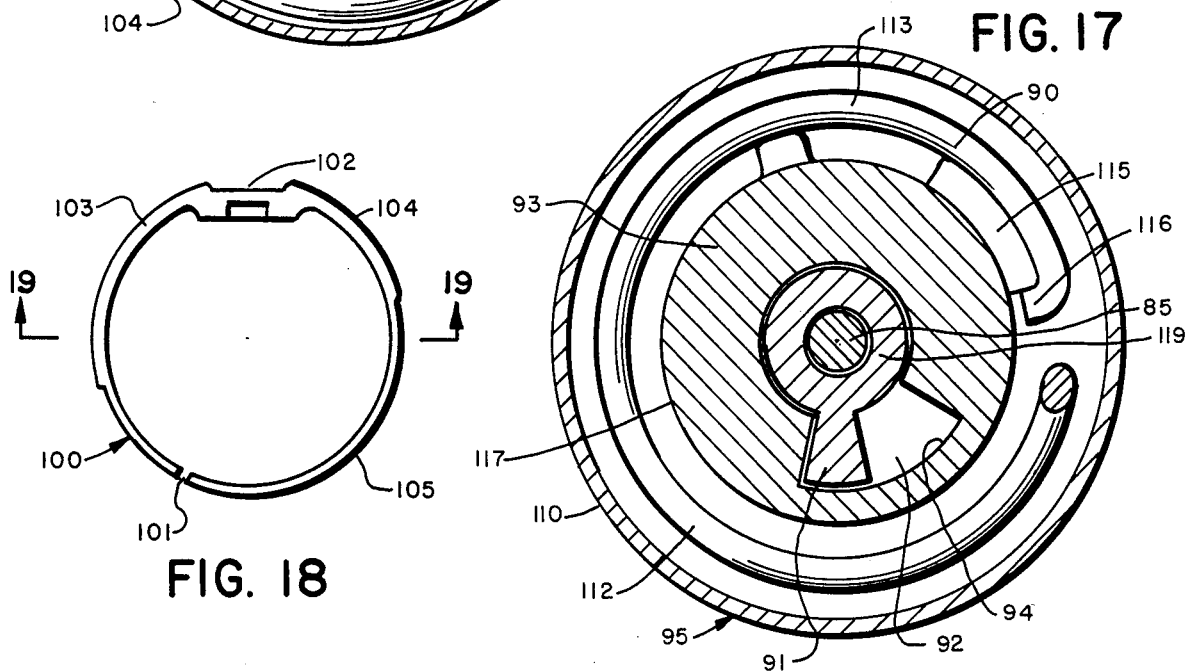
FIG. 17
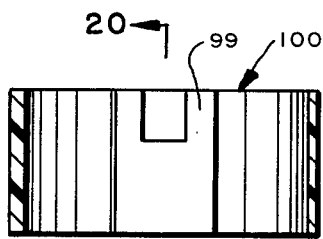
FIG. 18
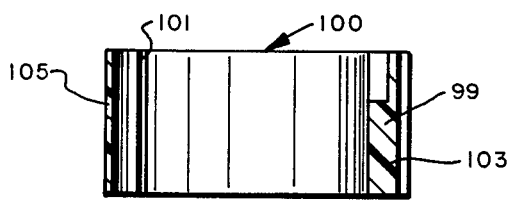
FIG. 19
FIG. 20

BELT TENSIONER

TECHNICAL FIELD

The invention relates to belt tensioning devices and in particular to spring biased belt tensioners for use with endless drive belts of the drive system for vehicle accessories. More particularly, the invention relates to a simple and inexpensive belt tensioner operated by a torsional spring having an arcuate strip of plastic material which provides a bearing surface on which a belt tensioning lever arm rotates during tensioning of the belt and which also provides an enhanced damping action on the lever arm which is in relationship to the force exerted by the belt against an idler pulley independent of the tensioning force of the torsional spring.

BACKGROUND ART

There is a trend today in the automobile industry to operate the various vehicle accessories, such as the power steering pump, oil and air pumps, air conditioning and alternator, by a single endless belt driven by a pulley connected to the engine crankshaft. This system is referred to as a "serpentine" drive belt system when both sides of the belt are used to drive pulleys. To provide optimum operating efficiency for these various accessories and for satisfactory belt life, it is necessary that the drive belt be maintained at a predetermined tension. Due to the relatively greater length for the single drive belt which replaces the heretofore plurality of smaller belts, there is a greater tendency for the belt to stretch which will affect the operating characteristics of the driven accessories. Therefore, it is desirable that a belt tensioning device be used for these endless belts to provide reliable service over an extended period of time and to maintain a constant amount of tension on the belt regardless of the amount of belt stretch.

Numerous devices have been proposed and used to accomplish this purpose. One type of tensioner uses a bushing formed of an elastomeric material which is placed in compression by some mechanical means for continuously exerting a tensioning force on the belt. Examples of these constructions are shown in U.S. Pat. Nos. 3,975,965 and 4,144,772. These tensioning constructions have the disadvantage that the bushing must serve as the spring, provide the required damping and also maintain the alignment of the arm and all of these functions are therefore compromised. The spring rate comprise results in belt tensioner variation and the damping compromise results in a lack of motion control. Also, the bushing softness allows the arm to deflect resulting in less alignment control of the arm and pulley.

Numerous other types of belt tensioning devices use coil springs which are either in compression or tension, for applying and maintaining the tensioning force on a belt-engaging idler pulley or chain-engaging sprocket. Some examples of these types of constructions are shown in U.S. Pat. Nos. 2,703,019; 2,893,255; 3,413,866; 3,483,763; 3,631,734; 3,768,324; 3,812,733; 3,924,483; 3,965,768 and 4,108,013. Some of these coil spring-actuated devices use the biasing force of a spring in combination with hydraulic-actuated members for regulating the amount of tensioning force applied to the belt, depending on whether the engine is running or shut off. Examples of these combination spring and hydraulic belt tensioners are shown in U.S. Pat. Nos. 2,051,488; 3,142,193; and 4,077,272.

Other known belt tensioner constructions, such as shown in U.S. Pat. No. 3,924,483, use a torsional spring for pivotally moving one of the vehicle accessories to achieve the desired tensioning force. Other constructions, such as shown in U.S. Pat. Nos. 3,136,170; 3,483,763; 3,834,246; and 4,285,676, use a torsional coil spring for pivotally moving a lever and idler pulley into belt tensioning engagement which provides a relatively simple, economical and compact unit. U.S. Pat. No. 4,473,362 shows still another belt tensioner which uses a torsional coil spring to provide a variable damping force by applying the radial forces exerted by the volutes of the spring against an internal elastomeric bushing.

It is desirable that a belt tensioner be provided with some type of damping means to prevent excessive oscillation from occurring in the spring tensioning member, and which will absorb sudden shocks to prevent a whipping action from occurring in the tensioner and drive belt. This damping action is especially critical when a coil spring is used for applying the belt tensioning force since coil springs are highly susceptible to developing natural oscillating frequencies when the counter force, which is exerted thereon by the belt, fluctuates during acceleration action. Such fluctuations effect the efficiency of the tensioning force applied to the belt by the coil spring.

Various damping devices have been used with belt tensioners to eliminate or reduce this problem of coil spring oscillation. One type of construction uses a hydraulic fluid as the damping means, such as shown in U.S. Pat. Nos. 2,893,255; 3,964,311; and 3,986,407. U.S. Pat No. 3,710,634 shows a belt tensioner which uses an eccentrically mounted mechanical pinion and rack arrangement which is spring biased by a leaf spring for absorbing an excessive amount of shock as opposed to providing a damping action for spring-biased belt tensioning plunger.

It also is highly desirable when developing a belt tensioner intended primarily for use on an automobile to devise a construction which can be produced as inexpensively as possible without sacrificing durability and efficiency, since a savings of only part of a dollar will amount to a sufficient overall savings when considering the millions of vehicles that are produced by the various vehicle manufacturers on which such belt tensioners will be mounted.

A predetermined amount of frictional torque is required to be exerted against the lever arm in order to stabilize the lever arm and idler pulley and keep it from bouncing continuously during fluctuations in belt loading caused by the cyclic acceleration and deceleration of the engine during idle and the like. It is difficult to get the desired amount of damping torque with existing belt tensioner constructions when the damping force is applied to the bearing on which the lever arm is pivotally mounted since the radius from the pivotal centerline to the point of sliding contact is relatively small thereby providing a corresponding relatively small effective arm length at which the bearing friction acts and which results in frictional damping torque. Therefore, to increase frictional torque when using the bearing surface to provide the frictional damping, it has been necessary to go to a material of higher frictional coefficient or to employ a bearing geometry capable of increasing the radial bearing loads or to increase the effective arm length between the bearing friction surface and the pivotal centerline. It has been found that a frictional torque of approximately 25% of the spring torque is sufficient to suppress nearly all of the vibration of the drive belt tensioner.

Most prior tensioner constructions have insufficient frictional damping available from the drive belt force acting on their pivot bearings. They must provide additional and costly means of producing more damping torque. This is often accomplished by utilizing the forces and friction inherent in a torsion spring acting on the pivotal shaft of the arm by adding a bearing to reduce the wear between the spring and the shaft. It is some times accomplished by providing additional friction surfaces or viscous damping units, all of which increase the cost. It is desirable in belt tensioners to dissipate as quickly as possible the heat that is generated within the tensioner by the sliding friction of the lever arm on its pivot bearing, since such heat determines appreciably the life of the bearing.

Therefore, the need has existed for an improved belt tensioner having an improved damping arrangement in which the bearing generates all of the required damping friction in direct relationship to the force applied on the idler pulley by the drive belt instead of having an additional secondary means to generate the damping friction as heretofore achieved by prior belt tensioners.

DISCLOSURE OF THE INVENTION

Objectives of the invention include providing an improved device for tensioning the drive belt for vehicle accessories which maintains a generally constant predetermined tensioning force on the belt throughout the life of the belt regardless of whether the engine is on or off or operating at various speeds and conditions, and regardless of the position of the idler pulley in its tensioning movement range.

Another objective is to provide such a tensioning device which is of a relatively inexpensive design and is formed of lightweight metal castings which are assembled with a usual idler pulley and torsional spring; and in which an increased amount of damping friction can be achieved by the location and configuration of an outer bearing strip which provides the surface for sliding movement of the lever arm with respect to a stationary fixed base instead of relying on the tensioning spring to generate the damping friction as heretofore provided by prior art tensioning devices.

Still another objective is to provide such an improved belt tensioner in which the bearing surface for the lever arm is provided by an inexpensive arcuate strip of plastic material mounted either on the stationary pivot support base or on a housing portion of the lever arm, and located outside of the spring diameter, near the maximum housing diameter, to obtain the maximum frictional torque, bearing area and heat dissapation than heretofore able to be achieved on usual belt tensioners of the type in which the lever arm was pivotally mounted on a journal bearing within the spring at the center of a pivot support; and in which the bearing strip may be formed with two splayed areas to distribute the frictinal force thereon which increases the frictional damping action, as well as providing a greater area for dissipating the generated heat to increase bearing life.

A further objective is to provide such an improved belt tensioner in which in one of the embodiments, the bearing surface is located outside the periphery of the torsional coil spring thereby providing a large effective arm length for the frictional torque component, increasing the frictional torque available and increasing the surface area for effective heat dissipation; and in which the bearing strip may have raised bearing pad surfaces placed at the desired position of sliding contact between the stationary pivot base and movably mounted lever housing to compensate for tolerances in manufacturing and assembling of the various parts of the tensioner.

A still further objective is to provide such a belt tensioner in which the bearing strip is removably mounted on either the pivot base or lever arm housing by a key-keyway engagement; in which the bearing strip is provided with a resilient finger which retains the bearing strip in an installed position during installation; and in which the key and keyway are formed with stepped portions to insure that the bearing strip is installed in the correct position.

Another objective is to provide such an improved belt tensioner in which the arcuate bearing strip may be located inside the periphery of the torsional coil spring to enable a larger diameter spring to be used to achieve a required biasing force in those installations in which the amount of space available for the belt tensioner is relatively confined requiring a thinner belt tensioner than in those installations where the bearing strip is located outside of the coil spring resulting in a thicker tensioner; and in which the bearing strip may be provided with a relieved portion to prevent the accumulation of dirt and foreign particles on the bearing surfaces resulting in reduced efficiency.

A further objective is to provide such an improved belt tensioner which achieves the stated objectives in a simple, effective, rugged, and relatively inexpensive manner and which solves problems and satisfies needs existing in the art.

These objectives and advantages are obtained by the improved belt tensioner construction for automatically tensioning an endless drive belt of a drive system for vehicle engine accessories, the general nature of which may be stated as including: a pivot support base adapted to be mounted on a vehicle adjacent the drive belt; lever means pivotally mounted on the support base for movement toward and away from the drive belt; pulley means rotatably mounted on the lever means and engageable with the drive belt for applying a tensioning force on said belt when the lever means is biased in a belt-tensioning direction toward the drive belt; coil spring means acting between the support base and lever means for biasing the lever means in the belt tensioning direction; and a one piece arcuate-shaped bearing strip of plastic material located between the lever means and support base to provide a bearing surface against which the lever means slides upon movement of the lever means towards and away from the drive belt and to provide frictional damping for the lever means, said strip having a recessed portion dividing the strip into a pair of arcuately-shaped bearing surfaces.

BRIEF DESCRIPTION OF THE DRAWINGS

Preferred embodiments of the invention, illustrative of the best modes in which applicant has contemplated applying the principles, are set forth in the following description and are shown in the accompanying drawings and are particularly and distinctly pointed out and set forth in the appended claims.

FIG. 1 is a diagrammatic view looking toward a front of an engine illustrating an endless drive belt operatively connected to and driving the vehicle accessories with the improved belt tensioner engaged with the belt;

FIG. 2 is an enlarged elevational view of the belt tensioner of FIG. 1 removed from engagement with the endless drive belt;

FIG. 3 is an enlarged perspective view of the pivot support base component of the improved belt tensioner;

FIG. 4 is a fragmentary top plan view of the interior of the lever arm housing component of the improved belt tensioner of FIG. 2;

FIG. 12 is a plan view, similar to FIG. 2, of a modified form of the improved belt tensioner;

FIG. 13 is an enlarged plan view of the interior of the pivot support base of the belt tensioner shown in FIG. 12;

FIG. 14 is an enlarged sectional view taken on line 14—14, FIG. 12;

FIG. 15 is an enlarged perspective view showing the arcuate-shaped bearing strip component of the embodiment of the improved belt tensioner shown in FIG. 12;

FIG. 16 is a sectional view taken on line 16—16, FIG. 14;

FIG. 17 is a sectional view taken on line 17—17, FIG. 14;

FIG. 18 is a reduced top plan view of the bearing strip of FIG. 15;

FIG. 19 is a sectional view taken on line 19—19, FIG. 18;

FIG. 20 is a sectional view taken on line 20—20, FIG. 19;

Similar numerals refer to similar parts throughout the drawings.

BEST MODE FOR CARRYING OUT THE INVENTION

Figure 5:
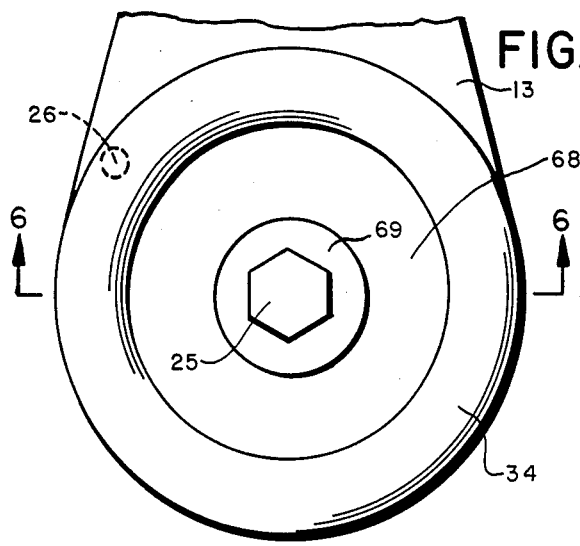
FIG. 5 is an elevational view of the exterior of the lever arm housing component of the improved belt tensioner as shown in FIG. 4.
Figure 7:
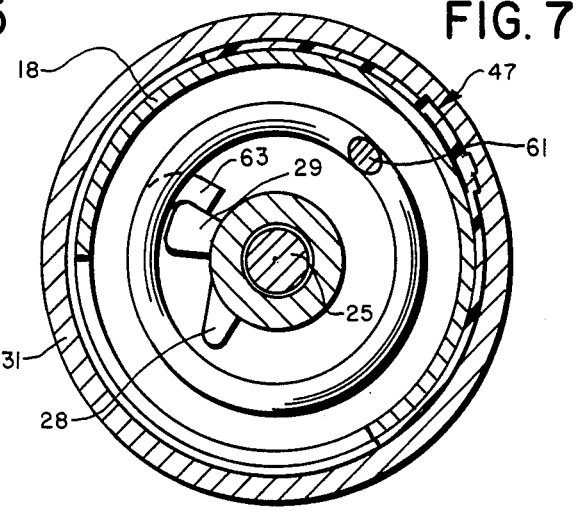
FIG. 7 is a sectional view taken on line 7—7, FIG. 6.

Referring to FIG. 1 of the drawings, the improved belt tensioner is indicated generally at 1, and is shown in tensioning engagement with an endless drive belt 2 of a power transmission belt drive system which is shown diagrammatically looking towards the front of an engine. The accessory drive system consists of a plurality of belt pulleys or sheaves having configurations and diameters determined by and associated with engine accessory components and their locations relative to each other. The various pulleys are supported on their respective engine components which in turn are mounted on an engine (not shown) in a usual manner known in the art. Belt 2 preferably operates in a single vertical plane to elminiate binding and skewing of the belt.

The particular engine accessories drive system as shown in FIG. 1, consists of a main driving pulley 3 which is operatively connected to the main drive shaft of the engine, a pulley 4 which is operatively connected to the engine alternator, a pulley 5 which is connected to the power steering unit, a pulley 6 which is connected to the engine water pump and a pulley 7 which is connected to the air conditioning unit.

Improved belt tensioner 1 (FIGS. 2-11) includes two main components, a lever arm assembly indicated generally at 10, and a pivot support base indicated generally at 11 (FIG. 3). Both of these components preferably are formed of lightweight aluminum castings. An idler pulley 12 is rotatably mounted on an extended end of a lever arm 13 by a stub shaft and bearing arrangement 14 in a usual manner well known in the art. Lever arm assembly 10 in addition to lever arm 13, includes a generally cylindrical shaped housing indicated generally at 15, which is formed integrally with arm 13. Arm 13 projects generally radially outwardly from housing 15 and is generally rotatably mounted on pivot support base 13 as described more fully below. The particular configuration of idler pulley 12 and its rotational mounting on the extended end of lever arm 13 is not shown in detail but is well known in the art. Furthermore, pulley 12 may have various configurations and mounting arrangements without affecting the concept of the invention.

Support base 11 has a disc-shaped end wall 17 and a semi-cylindrical axially extending side wall 18 which has a stepped lower portion 19 and an intermediate stepped portion 20 (FIG. 3). Side wall 18 including stepped side wall portions 19 and 20, have a common diameter and form a smooth circumferentially extending outer surface having a diameter less than that of end wall 17 so as to form an annular flange 21 along the outer edge of end wall 17 outside of the cylinder defined by side wall 18. An axially extending generally cylindrical centerpost 23 is formed integrally with end wall 17 and extends axially therefrom concentrically within side wall 18. Post 23 is formed with a center bore 24 which extends completely throughout the length of post 23 and through end wall 17 to provide a mounting hole for receiving a bolt 25 therethrough (FIG. 6) for mounting the belt tensioner onto a vehicle engine or bracket in a fixed position closely adjacent to drive belt 2.

A locating pin 26 is formed on the bottom of end wall 17 which functions as an alignment pin for properly mounting and positioning tensioner 1 on an engine by main mounting bolt 25. A pair of circumferentially spaced projections 27 and 28 are formed integrally with the base of centerpost 23 and end wall 17 for engagement with a projection 29 (FIG. 8) formed on lever housing 15 to limit the movement of lever arm assembly 10 on support base 16.

Lever housing 15 (FIGS. 4, 6, 7, and 8) includes a generally cylindrical side wall 31 and an recessed annular-shaped end wall 32 having a circular central opening 33. Recessed end wall 32 is connected with cylindrical sidewall 31 by a raised annular-shaped end wall portion 34 and cylindrical wall 38.

Figure 6:
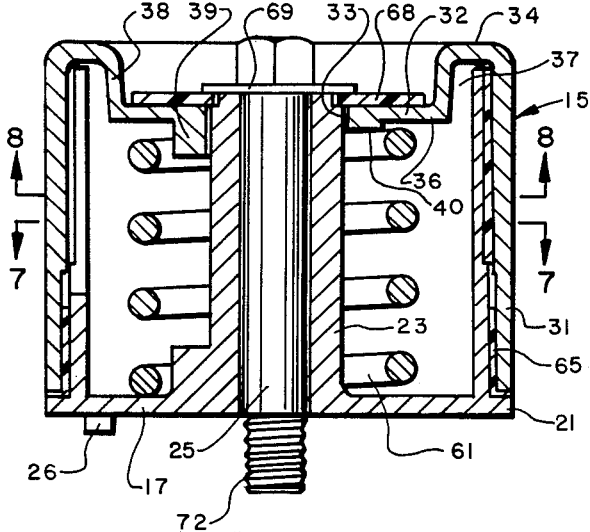
FIG. 6 is a sectional view taken on line 6—6, FIG. 5.
Figure 8:
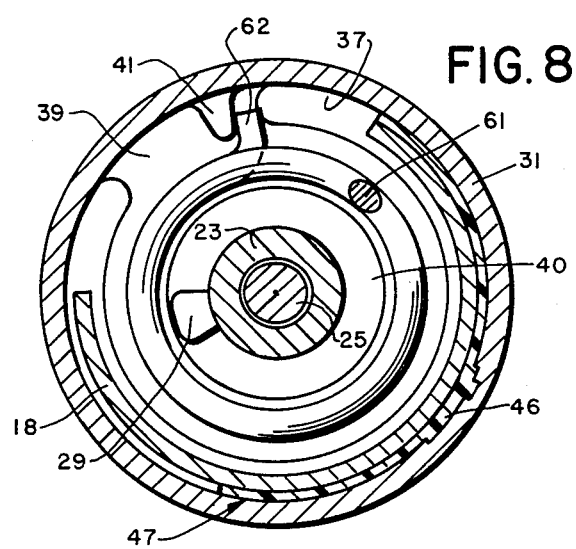
FIG. 8 is a sectional view taken on line 8—8, FIG. 6.

The interior of lever housing 15 is shown particularly in FIGS. 4 and 6, and includes an annular-shaped raised center portion 36 defined by annular end wall 32. Spring support projection 29 is formed on center portion 36. A generally annular-shaped recess 37 extends throughout the interior of the housing 15 adjacent cylindrical wall 31 being formed by the generally inverted U-shaped configuration defined by annular top wall portion 34, cylindrical wall 38, and the upper end of side wall 31 as shown in FIG. 6. Annular recess 37 is interrupted at one portion by a raised area 39 which lies on the same plane as an annular area 40 which surrounds raised center portion 36. A projection 41 (FIG. 8) is formed integrally with the top surface of raised area 39 and the inner surface of cylindrical wall 31 and is engaged by an outwardly extending bent end 62 of a torsional coil spring 61.

Figure 9:
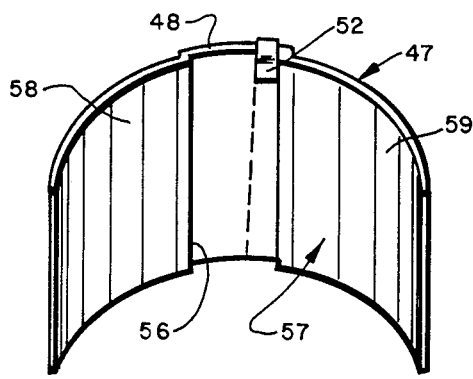
FIG. 9 is a perspective view of the arcuate-shaped bearing strip component of the improved belt tensioner.
Figure 10:
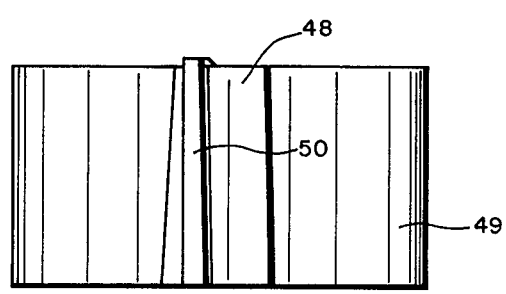
FIG. 10 is a rear elevational view of the bearing strip shown in FIG. 9.
Figure 11:
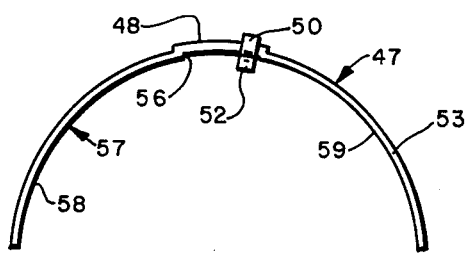
FIG. 11 is a top plan view of the bearing strip shown in FIGS. 9 and 10.

In accordance with one of the features of the invention, a tapered stepped keyway 46 is formed in the inner surface of cylindrical wall 31 for slidably receiving a bearing strip indicated generally at 47 (FIGS. 9-11). Bearing strip 47 is an arcuate shaped piece of semirigid plastic material formed with a stepped key 48 projecting outwardly from the rear surface 49 thereof which includes a raised key area 50. Key 48 is complementary with and is slidably engaged in stepped keyway 46 for slidably mounting bearing strip 47 therein on the interior surface of housing wall 31. A small outwardly projecting resilient plastic finger 52 is formed adjacent edge 53 of the bearing strip and is adapted to set into a small recess 54 formed in annular recess 37 (FIG. 4) of housing 15 and bend upwardly along cylindrical wall surface 38 which joins annular area 40 with top wall protion 34 (FIG. 6). Resilient finger 52 retains bearing strip 47 within keyway 46 once inserted therein during installation of lever housing 15 with pivot support base 11.

An arcuate-shaped recess 56 is formed in the concave surface 57 of bearing strip 47 dividing the bearing strip surface into two distinct surface portions 58 and 59 (FIGS. 9 and 11). Bearing strip 47 has an arcuate length of approximately 180 degrees but could be of a smaller length if desired without affecting the concept of the invention.

A torsional coil spring 61 having bent ends 62 and 63 is telescopically mounted about centerpost 23 (FIG. 6) within semi-cylindrical wall 18 of support base 11. Inwardly bent end 63 engages projection 27 (FIG. 7) and outwardly bent end 62 engages projection 41 which is formed on annular area 40 within lever housing 15 as described above (FIG. 8).

An annular sealing ring 65 is seated on flange 21 of end wall 17 and extends about semi-cylindrical wall 18 of pivot support base 11 (FIG. 6) providing a seal with the circular edge of cylindrical wall 31 of lever housing 15 to prevent dirt and other debris from entering into the closed interior of the pivot support base 11 and housing 15.

In accordance with one of the main features of the invention, lever assembly 10 is slidably moveably mounted on pivot support base 11 as shown in FIG. 6 by the sliding engagement of bearing strip 47 on the outer surface of semi-cylindrical wall 18. The upper end of centerpost 23 extends through central opening 33 of lever housing 15 with a loose engagement therebetween since housing 15 is not pivotally mounted direcly on center post 23. Center post 23 supports a sealing washer 67 and a clamping washer 69 for retaining arm assembly 10 on support base 11. Threaded end 72 of bolt 25 is engaged in a corresponding threaded opening formed in the vehicle engine or mounting bracket to mount tensioner 1 thereon.

Coil torsional spring 61 is placed in a stressed state when lever housing 15 is assembled with support base 11, biasing idler pulley 12 in a clockwise direction (FIG. 1), and in accordance one of the main features of the invention, bearing strip 47 providing the sliding frictional bearing surface for the rotational or pivotal movement of lever housing 15 about support base 11 when biased in the counter-clockwise direction by spring 61 and when housing 15 moves in a counter-clockwise direction upon experiencing a counter-biasing force thereon by fluctuations in belt 2. It is this sliding engagement along strip 47 which generates the frictional torque to provide the required damping to the belt tensioner.

Figure 21:
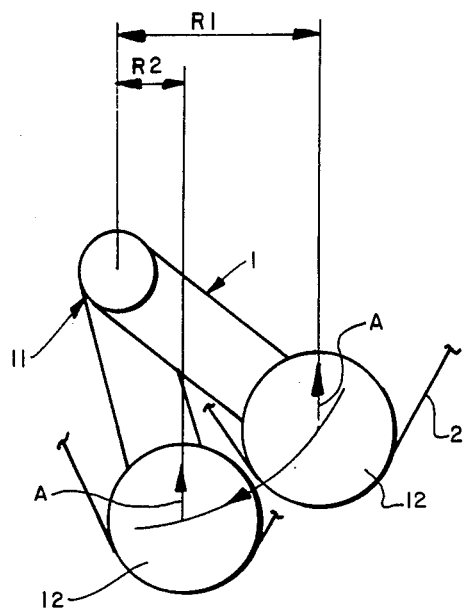
FIG. 21 is a diagrammatic view showing the improved belt tensioner in a maximum and minimum tensioning position with a drive belt.
Figure 22:
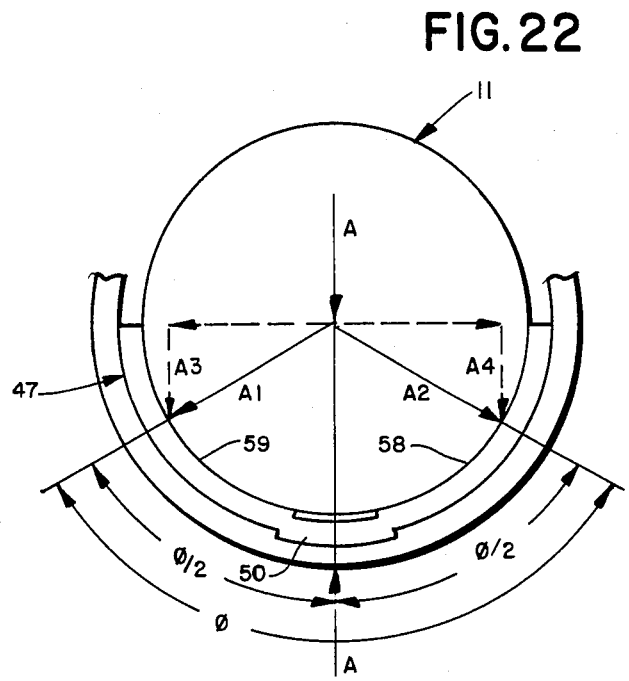
FIG. 22 is a diagrammatic force diagram showing the increased normal forces acting on the arcuate-shaped bearing strip to increase the frictional torque when the belt tensioner is in the upper most position of FIG. 21.
Figure 23:
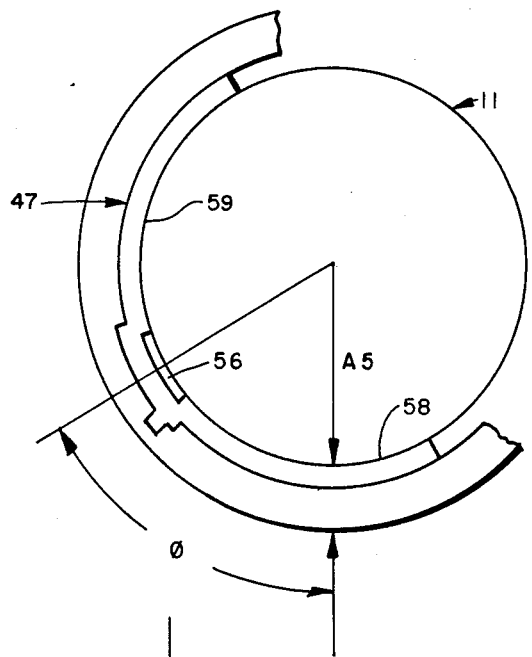
FIG. 23 is a diagrammatic view similar to FIG. 22 showing the reduced normal component resulting in reduced frictional torque when the belt tensioner is in the lower position of FIG. 21.
Figure 22A:
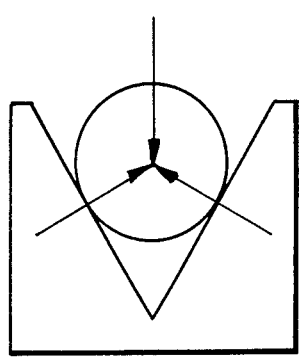
FIG. 22A is another diagrammatic force diagram.

The principle of operation of improved belt tensioner 1 is illustrated diagrammatically in FIGS. 21-24. FIG. 21 shows tensioner 1 in a two different belt tensioning positions. The upper position is at the time of initial installation of the tensioner on a new belt 2, with the lower position being the position the belt tensioner will assume after the belt has stretched over a period of time. The frictional torque developed by the bearing strip would be ideally proportional to the effective arm length R1, R2 multiplied by the hub load A. The hub load A does not change greatly with arm position but the effective arm length does. Therefore frictional torque should change with arm position and should be greater when the effective arm length is greater (R1). The hub load, force A, must pass through the bearing strip and into the support base by changing the path of the load from direct as shown in FIG. 23 to indirect as shown in FIG. 22. We can increase the forces acting radially on the bearing strip surface by a "wedging effect", FIG. 22A.

The forces generated on bearing strip 47 are shown diagrammatically in FIG. 22 in which the vertically acting hubload force A is reacted by the vertical components of normal forces A1 and A2, the horizontal components of forces A1 and A2 cancel each other. The sum of the vertical components of forces A1 and A2 are equal to force A but the sum of the forces A1 and A2 is actually larger than force A. It is force A1 and A2 acting on the friction pad portions 58 and 59 of bearing strip 47 which generate the frictional bearing torque. It can be seen that the hubload force A may be amplified at the friction pad surfaces by "splaying" the two surfaces at angle $\phi$ and that by increasing $\phi$ we may increase frictional torque. In order to develop the forces A1 and A2, it is necessary that clearance 50 in FIG. 22 be present and separating surfaces 58 and 59. In FIG. 23 clearance 56 is present but not functional since only pad 58 is loaded.

This increased friction force is desired at the time that the belt tensioner is installed on the vehicle or a new belt is placed on the vehicle accessories in contrast to the situation shown in FIG. 23 wherein the belt has moved from the initial installation position to the lower position of FIG. 21, wherein the belt has reached a stretched condition. In this stretched position, the force components are shown generally as illustrated in FIG. 23 when the friction load exerted on bearing strip 47 is generally equal to the force component A since the same is applied to only surface portion 58. A small amount of force component could be exerted on surface 59 without effecting the results achieved thereby. This diagrammatic force loading of FIGS. 21-23 may vary without affecting the concept of the invention but is illustrative of the efficiency and improved damping achieved by improved belt tensioner 1.

Figure 24:
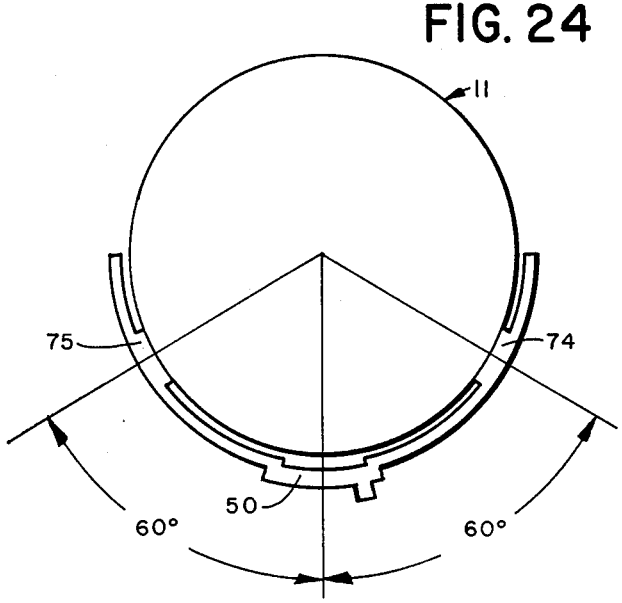
FIG. 24 is a diagrammatic view showing a modified form of the arcuate-shaped bearing strip.

FIG. 24 diagrammatically shows another modification not shown in FIGS. 1-11, in which a pair of raised friction pad areas 74 and 75 may be formed on surface portions 58 and 59, respectively of bearing strip 47, to insure that contact occurs at the areas desired to achieve the most efficient force distribution as illustrated in FIG. 22. By providing the raised pad areas, it is insured that minor manufacturing tolerances in the various components of tensioner 1 will not affect the point of sliding contact between the outer surface of support baes wall 18 with bearing strip 47. Pad area 74 and 75 will eventually wear away to the level of the remaining arcuate surface area after a period of use. However, after this same period of use the various minor manufacturing tolerance and any out of alignment present in the components will have been compensated for by wearing of the parts so that the area of contact is unaffected by any such initial manufacturing tolerances present in a new belt tensioner.

A modified form of the improved belt tensioner is shown in FIGS. 13-20 and is indicated generally at 77. Belt tensioner 77 includes a pivot support base 78 which is adapted to be mounted in a fixed position on the vehicle engine adjacent the drive belt 2. A lever arm indicated generally at 79, is movably mounted on support base 78. Support base 78 includes a main disc-shaped end wall 80 having an alignment pin 81 extending outwardly from an outer surface thereof and has a central generally annular shaped boss 83 projecting outwardly from the opposite surface thereof. A central mounting hole 84 extends through bos 83 for receiving a mounting bolt 85 therethrough which is attached to the vehicle engine or a mounting bracket. A pair of elongated projections 86 and 87 are formed on the inner surface of end wall 80 (FIG. 13) which is engaged with an end 89 of a torsional coil spring 90 (FIG. 16) which is mounted within lever arm assembly 79 as described more fully below for biasing the improved belt tensioner in a belt tensioning direction. A stop projection 91 is formed intergrally on a top annular surface 92 of annular boss 83 which extends through an arcuate shaped opening 94 (FIG. 17) which is formed in an inner end wall 93 of lever housing 95 of lever arm assembly 79.

A stepped keyway 97 (FIGS. 13 and 16) is formed along cylindrical sidewall 98 of central boss 83 for slidably receiving a stepped key 99 formed on an annular bearing strip 100 (FIG. 15). Bearing strip 100 is similar in many respects to bearing strip 47 of belt tensioner 1 but is in the shape of annular band having a split 101 at one location on its circumference. Key 99 is located on the inside of a recessed portion 102 which is similar to arcuate shaped recess 56 of bearing strip 47 in that it divides the bearing strip into a pair of bearing surfaces portions 103 and 104 extending arcuately around the bearing strip from recess portion 102. The stepped configuration of key 99 and of complementary-shaped keyway 97 insures that bearing strip 100 can be installed in only one direction on annular boss 83.

As shown in FIG. 15, bearing surface portions 103 and 104 are raised or have a larger diameter than the remaining arcuate portion 105. Raised bearing surfaces 103 and 104 assist in providing accurate contact with lever arm assembly 79 as discussed above with respect to raised friction pad areas 74 and 75 as shown in FIG. 24. The reduced diameter of portion 105 provides an annular relief space between bearing strip surfaces 103-104 and an inner cylindrical surface 106 of lever housing 95 to prevent the accumulation of dirt and other foreign objects from accumulating along bearing strip surface portions 103 and 104.

Lever housing 95 (FIGS. 12, 14, 16, and 17) includes a radially extending arm portion 108 on which an idler pulley 109 is rotatably mounted by a bearing assembly 107. Lever housing 95 is formed by an outer cylindrical wall 110 and a concentric inner cylindrical wall 111 which form an annular space 112 therebetween. Cylindrical walls 110 and 111 are connected at one end by an annular shaped end wall 113 (FIG. 14). A projection 115 (FIG. 17) is formed on annular end wall 113 for engagement with an inturned spring end 116. Spring 90 is located within the annular space 112 (FIG. 14) with spring end 116 engaging lever housing 95 with the opposite spring end 89 engaging projections 86 and 87 of support base 78 providing the biasing force on lever arm assembly 79 in a similar manner as described above with respect to belt tensioner 1. Key-shaped projection 91 formed on annular boss 83 of support base 78 engages the edges of arcuate shaped opening 94 (FIG. 17) of inner annular end wall 93 which limits the rotational movement of lever arm assembly 79 with respect to support base 78.

The operation of modified belt tensioner 79 is similar to that described above with respect to belt tensioner 1 except that bearing strip 100 is mounted on fixed base support 78 with the movable outer member, lever housing 95, being slidably engaged therewith in contrast to that of belt tensioner 1 wherein the bearing strip 47 is mounted on the rotating component for slidable engagement with a fixed arcuate surface on the fixed component of the belt tensioner. Bearing strip 100 has the double or splayer arcuate spaced bearing surface portions 103 and 104 as does bearing strip 47 to provide the increased frictional damping force created thereby as shown particularly in FIG. 22. Modified tensioner 77 enables the belt tensioner to have a thinner overall dimension in the axial direction which is useful in those vehicles having limited space for mounting of the tensioner. In tensioner 77, the bearing strip is located within the torsional spring, which spring must have a larger diameter to achieve the tensioning force. In the thicker belt tensioners where sufficient axial space is available, a spring having more coils of a smaller diameter can be used to provide the same spring tensioning force.

In belt tensioner 77, the sliding engagement between the two components, support base 78 and lever arm assembly 79, is exerted on bearing strip 100 since as shown in FIG. 14, the stepped outer annular end 119 of central annular boss 83 which extends through a complementary shaped opening 120 formed in end wall 93 is loose enough to prevent sliding engagement therebetween with the majority of the sliding force being exerted on the splayed bearing strip portions 103 and 104. End wall 80 of support base 78 and end walls 93 and 113 of lever arm assembly 79 provide an enclosure for the interior of lever arm housing 95 to prevent dirt and other debris from entering into the housing and affecting the frictional sliding contact between bearing strip 100 and the inner surface of inner cylindrical wall 111 which provides the damping for the belt tensioner. A sealing washer 122 (FIG. 14) is mounted about a stepped end of annular boss 83 to prevent dirt from entering between outer end 119 of boss 83 and end wall 93 about opening 120 thereof. An annular sealing ring 124 preferably is mounted on the annular top edge of outer cylindrical wall 110 for sliding engagement with the stepped annular outer edge 125 of end wall 80 to further prevent contaminates from entering into the interior of lever housing 95.

SUMMARY

Improved belt tensioner constructions 1 and 77 provide a tensioning device in which the frictional damping force is achieved by a sliding bearing surface located on the periphery of either the stationary base or on the rotatably mounted lever housing by means of a plastic bearing strip preferably splayed or divided into two arcuate spaced surface portions, which provides for an increase of the frictional torque on the slidably engaged part, which is in relationship to the effective arm length established by the location of the idler pulley with respect to the pivot support base, which is in relationship to the amount of stretch occuring in the accessory drive belt. The bearing strip provides for the main sliding engagement between the fixed and movable components eliminating the heretofore journal type bearing used in many prior belt tensioners which relay on a separate damping spring or component to provide the damping effect to prevent unwanted fluctuations or bouncing in the idler pulley due to fluctuations in the engine operating condition. The improved belt tensioner is able to achieve an increased frictional damping force by increasing the radius of the frictional surface from the center point of the fixed tensioner element toward the outside to maximize the radius, to provide the greatest possible percentage of frictional torque available for damping.

In one embodiment the torsional coil spring which provides the belt tensioning force, is located outside of the bearing strip, wherein the other embodiment, the torsional coil spring is located inside of the frictional bearing strip thereby providing for various thickensses in the belt tensioner overall configuration enabling the tensioner to be adapted to match the available space adjacent the engine for mounting the tensioner at the desired location without sacrificing the amount of damping force provided thereby.

Another advantage achieved by the improved belt tensioner is the reduction in the harmful effect caused by the heat which is generated by the frictional sliding engagement between the movable and stationary components of the tensioner. The greater frictional surface area which is achieved by its increased radius from the centerpoint of the fixed member, is better able to dissipate the heat than if concentrated at the center of the member as in prior tensioners. Also the location of the bearing strip adjacent the outer wall of the housing is better able to dissipate the heat resulting in increasing bearing life. Furthermore, dividing the contact area of the bearing strip into two separate circumferentially spaced portions amplifies the frictional load causing the damping force to increase which is especially desirable at the initial installation of the tensioner or when a new belt is installed such as shown in FIG. 22. A greater frictional damping torque is desirable for a tensioner position given by a new belt. After the belt has stretched, moving the tensioner to a position having a smaller effective arm length, less frictional damping torque is necessary to achieve the desired damping.

Preferably the centers of the bearing surfaces are approximately 60 degrees on either side of the centerline of the applied force to provide the optimum operating condition. The improved belt tensioners match the frictional torque to the arm length of the tensioner since when the belt acts on the tensioner, it acts through the arm length. In a new belt, there is more disturbing torque acting on the tensioner than in the stretched belt position resulting in the need for more damping torque in the unstretched position than in the stretched position which is achieved by the improved belt tensioners 1 and 47.

Another disadvantage of the improved belt tensioner is the providing of raised or pad like surfaces on the bearing strip surfaces at the location desired for sliding contact between the members to insure that the frictional force is accurately applied at the desired location regardless of tolerances in the manufacture and installation of the component parts. Although the drawings and above description shows the bearing strip as having a splayed configuration, a continuous bearing surface still would provide many of the advantages of the invention.

Another important feature of the improved belt tensioners is that the spring and bearing strip housings are completely enclosed preventing the entrance of dirt and debris onto the frictional sliding surface areas. In many prior belt tensioner constructions, the bent ends of the springs extend through opening in the housing which provides an area through which the dirt and debris can enter the housing which is not present in the belt tensioners of the present invention. Furthermore, the location of the key and keyway for mounting of the bearing strips within the lever arm housings and the offset configurations thereof insures that the bearing strips and the slayed contact portions thereof are in the desired location and that the bearing strips are installed correctly.

Accordingly the improved belt tensioner provides an increased amount of damping friction by a simple mechanism, which relies upon the belt force acting on the idler pulley and correspondingly on the lever arm to generate the friction and which does not rely on the tensioning spring to generate the damping friction directly as heretofore achieved in most prior art belt tensioners.

Accordingly, the improved belt tensioner construction is simplfied, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the improved belt tensioner is constructed and used, the characteristics of the construction, and the advantageous, new and useful results obtained; the new and useful structures, devices, elements, arrangements, parts, and combinations, are set forth in the appended claims.

What is claimed is:

1. A belt tensioner construction for automatically tensioning an endless belt of a drive system for vehicle accessories, said tensioner construction including:
   (a) a support base adapted to be mounted on a vehicle adjacent the drive belt;
   (b) lever means pivotally mounted on the support base for movement toward and away from the drive belt;
   (c) pulley means rotatably mounted on the lever means and engageable with the drive belt for applying a tensioning force on said belt when the lever means is biased in a belt-tensioning direction toward the drive belt;
   (d) coil spring means acting between the support base and lever means for biasing the lever means in the belt tensioning direction; and
   (e) an arcuate-shaped bearing strip of plastic material located between the lever means and support base to provide a bearing surface against which the lever means slides upon movement of the lever means toward and away from the drive belt and to provide frictional damping for the lever means, said strip having a pair of distinct spaced bearing surfaces separated by a clearance area.

2. The belt tensioner construction defined in claim 1 in which the support base has an upstanding arcuate-shaped wall; in which the lever means includes a housing telescopically rotatably mounted outwardly of said support base wall, said bearing strip being a one-piece member mounted on an inner surface of said lever means housing and slidably engaged with the support base wall.

3. The belt tensioner defined in claim 2 in which the lever means housing is cylindrical; in which the bearing strip has concave and convex arcuate-shaped surfaces with said concave surface engaging the support base to provide the bearing surface; in which said concave surface is formed with a groove which provides the clearance area and divides said concave surface into the pair of distinct bearing surfaces; and in which a key is formed on the convex surface and is slidably mounted in a keyway formed in the inner surface of the lever means housing.

4. The belt tensioner defined in claim 3 in which the key and keyway have complementary stepped configurations to insure correct mounting of the bearing strip on the lever means housing.

5. The belt tensioner defined in claim 1 in which the bearing strip has an arcuate length of approximately 180 degrees.

6. The belt tensioner defined in claim 2 in which the lever means housing has an end wall formed with a center opening; and in which the support base has an axially extending center post which extends into the center opening of the housing end wall forming a loose fit therebetween.

7. The belt tensioner defined in claim 6 in which the support base has an end wall; in which the center post and arcuate-shaped wall extend in a concentric relationship from said base end wall; in which the coil spring means is a torsional coil spring having a pair of ends, said spring being telescopically mounted about the center post; and in which one of the spring ends engages a projection formed on said end wall.

8. The belt tensioner defined in claim 7 in which the other spring end is engaged with a projection formed on the end wall of the lever means housing.

9. The belt tensioner defined in claim 8 in which a stop is formed on the end wall of the lever means housing; and in which the arcuate-shaped wall of the support base is engageable with the stop to limit the movement of the lever means between two belt tensioning limiting positions.

10. The belt tensioner defined in claim 6 in which a flexible finger is formed on the bearing strip and is biased into engagement with a raised annular center portion of the lever means housing end wall which surrounds the central opening, to retain the bearing strip within the lever means housing.

11. The belt tensioner defined in claim 7 in which the end wall of the pivot base extends outwardly beyond the arcuate-shaped wall thereof forming an annular flange; and in which an annular sealing ring is mounted between the annular flange of the support base and an edge of the lever means housing providing a seal between said support base and lever means housing restricting foreign objects from entering into said housing.

12. The belt tensioner defined in claim 1 in which the arcuate-shaped bearing strip is mounted on the support base.

13. The belt tensioner defined in claim 12 in which the support base has a central boss; and in which the bearing strip is formed with a key which is slidably mounted in a keyway formed in the central boss.

14. The belt tensioner defined in claim 12 in which the bearing strip is ring-shaped having a split at one location on its circumference; in which the bearing strip has an outer bearing surface provided with a groove which provides the clearance area and divides said surface into the pair of distinct bearing surfaces which extend circumferentially from said groove; and in which the bearing surfaces have larger radii of curvature than remaining portions of the bearing strip extending circumferentially toward each other from said bearing surface.

15. A belt tensioner construction for automatically tensioning an endless belt of a drive system for vehicle accessories, said tensioner construction including:
   (a) a suport base adapted to be mounted on a vehicle adjacent the drive belt, said base having a central boss formed with a keyway;
   (b) lever means pivotally mounted on the support base for movement toward and away from the drive belt;
   (c) pulley means rotatably mounted on the lever means and engageable with the drive belt for applying a tensioning force on said belt when the lever means is biased in a belt-tensioning direction toward the drive belt;
   (d) coil spring means acting between the support base and lever means for biasing the lever means in the belt tensioning direction; and
   (e) an arcuate-shaped bearing strip of plastic material located between the lever means and support base to provide a bearing surface against which the lever means slides upon movement of the lever means towards and away from the drive belt and to provide firctional damping for the lever means, said stip having a pair of spaced bearing surfaces and a key, said key being slidably mounted in the keyway of the central boss mounting said bearing strip on the support base.

16. A belt tensioner construction for automatically tensioning an endless belt of a drive system for vehicle accessories, said tensioner construction including:
(a) a support base adapted to be mounted in a fixed position on a vehicle adjacent the drive belt, said support base having an outer arcuate-shaped housing wall;
(b) lever means movably mounted on the support base for movement toward and away from the drive belt, said lever means having a housing telescopically located and extending about at least a portion of the support base housing walls;
(c) pulley means rotatably mounted on the lever means and engageable with the drive belt for applying a tensioning force on said belt when the lever means is biased in a belt-tensioning direction toward the drive belt;
(d) coil spring means acting between the support base and lever means for biasing the lever means in the belt tensioning direction, said spring means being located within the arcuate-shaped housing wall of the support base; and
(e) an arcuate-shaped bearing strip mounted on an inner surface of the lever means housing and engageable with the support base housing wall to provide a bearing surface for rotational sliding movement of the lever means about the support base upon movement of the lever means towards and away from the drive belt and to provide frictional damping for the lever means, said bearing strip having a recessed portion dividing said strip into a pair of spaced arcuately-shaped bearing surfaces.

17. The belt tensioner defined in claim 15 in which a stop is formed on the central boss base of the support base; in which the lever means has a generally cylindrical-shaped housing wall and an end wall having a key-shaped opening formed therein; and in which the stop extends into the key-shaped opening to limit the movement of the lever means between two belt tensioning limiting positions.

18. The belt tensioner construction defined in claim 16 in which a key is formed on the bearing strip and is slidably received in a keyway formed in the inner surface of the lever means housing to mount said bearing strip on said lever means housing.

19. The belt tensioner construction defined in claim 16 in which the support base has an axially extending center post concentric with the outer-arcuate-shaped wall of said support base; in which the coil spring means is a torsional coil spring and is telescopically mounted about said center post between said center post and support base housing wall; and in which the lever means housing includes a generally cylindrical-shaped wall which is telescopically mounted about the arcuate-shaped housing wall of the support base.

20. The belt tensioner construction defined in claim 19 in which the lever means housing includes an end wall formed with a central opening into which the center post of the pivot support base extends with a loose engagement therebetween; in which the coil spring has a pair of ends, one of which engages the lever means housing and the other engages the support base biasing the lever means in a rotational direction about the center post of said support base.

21. A belt tensioning construction for automatically tensioning an endless belt of a drive system for vehicle accessories, said tensioner construction including:

(a) a support base adapted to be mounted on a vehicle adjacent the drive belt, said base having an upstanding arcuate-shaped wall;
(b) lever means pivotally mounted on the support base for movement toward and away from the drive belt, said lever means having an upstanding arcuate-shaped housing wall movably mounted outwardly of and adjacent said support base wall;
(c) pulley means rotatably mounted on the lever means and engageably with the drive belt for applying a tensioning force on said belt when the lever means is biased in a belt-tensioning direction toward the drive belt;
(d) coil spring means acting between the support base and lever means for biasing the lever means in the belt tensioning direction, said spring means being located radially inwardly from the support base wall; and
(e) an arcuate-shaped bearing strip of plastic material located between the lever means housing wall and the support base wall and radially outside the spring means to provide a bearing surface on which the lever means rotates upon movement of the lever means towards and away from the drive belt and to provide maximum frictional damping for the lever means.

22. The belt tensioner defined in claim 21 in which the bearing strip has a pair of distinct circumferentially spaced bearing surfaces.

23. The belt tensioner defined in claim 22 in which centers of the pair of bearing surfaces are approximately 120° apart.

24. The belt tensioner defined in claim 22 in which the pair of bearing surfaces are separated by a clearance area; and in which the bearing surfaces are located approximately 60° on each side of said clearance area.

25. The belt tensioner defined in claim 21 in which the bearing strip has an arcuate length of approximately 180°.

26. A belt tensioner construction for automatically tensioning an endless belt of a drive system for vehicle accessories, said tensioner construction including:
(a) a support base adapted to be mounted on a vehicle adjacent the drive belt;
(b) lever means pivotally mounted on the support base for movement toward and away from the drive belt;
(c) pulley means rotatably mounted on the lever means and engageable with the drive belt for applying a tensioning force on said belt when the lever means is biased in a belt-tensioning direction toward the drive belt;
(d) coil spring means acting between the support base and lever means for biasing the lever means in the belt tensioning direction; and
(e) a ring-shaped bearing strip of plastic material mounted on the support base and located between the lever means and support base to provide a bearing surface against which the lever means slides upon movement of the lever means towards and away from the drive belt and to provide frictional damping for the lever means, said strip having a split at one location on its circumference and an outer bearing surface provided with a groove dividing said surface into a pair of spaced bearing surfaces which extend circumferentially from said groove, said surfaces having larger radii of curvature than remaining portions of the bearing strip extending circumferentially toward each other from said bearing surfaces.

* * * * *

REEXAMINATION CERTIFICATE (1724th)
United States Patent [19]
Thomey

[11] B1 4,723,934
[45] Certificate Issued Jun. 23, 1992

[54] BELT TENSIONER

[76] Inventor: Henry W. Thomey, Windsor, Canada

Reexamination Request:
No. 90/002,386, Jul. 10, 1991

Reexamination Certificate for:
Patent No.: 4,723,934
Issued: Feb. 9, 1988
Appl. No.: 924,437
Filed: Oct. 29, 1986

[51] Int. Cl.⁵ .............................................. F16H 7/12
[52] U.S. Cl. ................................................ 474/135
[58] Field of Search .............. 474/101, 109, 111, 133, 474/135

[56] References Cited
U.S. PATENT DOCUMENTS

| | | | |
|---|---|---|---|
| 4,285,675 | 8/1981 | Kraft | 474/135 |
| 4,472,162 | 9/1984 | Hitchcock | 474/135 |
| 4,473,362 | 9/1984 | Thomey et al. | 474/135 |
| 4,551,120 | 11/1985 | Thomey | 474/135 |
| 4,557,707 | 12/1985 | Thomey | 474/101 |
| 4,557,709 | 12/1985 | St. John | 474/117 |
| 4,583,962 | 4/1986 | Bytzek | 474/133 |
| 4,596,538 | 6/1986 | Henderson | 474/135 |
| 4,723,934 | 2/1988 | Thomey | 474/135 |

FOREIGN PATENT DOCUMENTS 2157391 8/1987 United Kingdom .

*Primary Examiner*—Thuy M. Bui

[57] ABSTRACT

A belt tensioning device for engagement with the endless drive belt of a vehicle accessories drive system. A pivot support base is adapted to be mounted on a vehicle engine in a stationary position adjacent the drive belt and has a lever arm assembly pivotally mounted thereon. An idler pulley is mounted on an extended end of the lever arm assembly and is biased into tensioning engagement with the drive belt by a torsional coil spring. An arcuate-shaped plastic bearing strip is located between arcuate surfaces of the pivot support base and an outer cylindrical housing portion of the lever arm assembly and has two distinct bearing surfaces. The lever housing slides on the bearing strip during movement of the lever arm towards and away from the drive belt which provides fictional damping for the lever to reduce undesirable movement of the idler pulley.

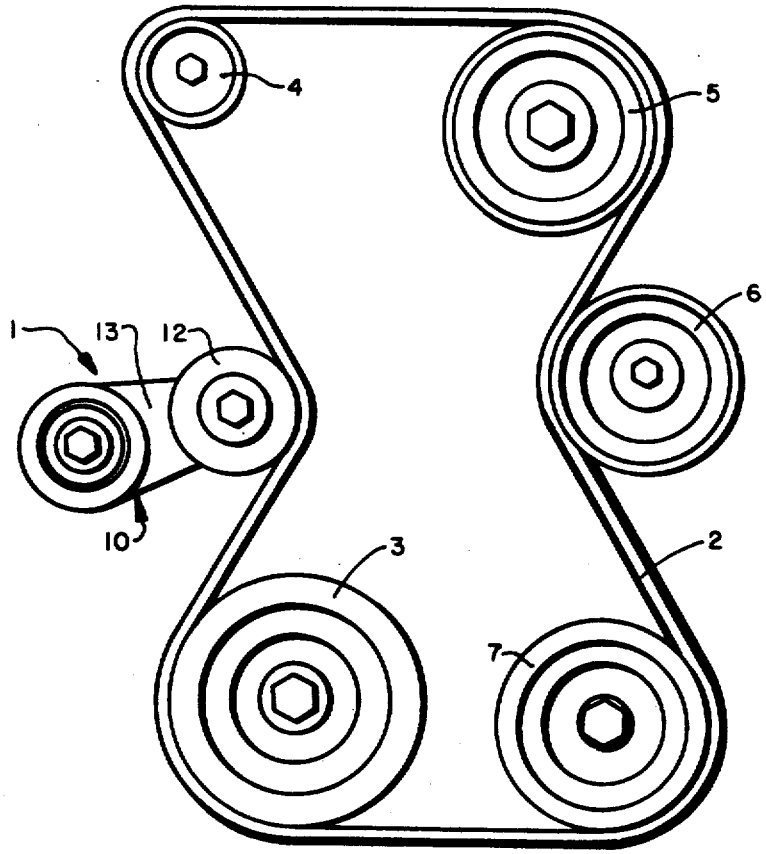

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–20 and 26 is confirmed.

Claim 21 is determined to be patentable as amended.

Claims 22–25, dependent on an amended claim, are determined to be patentable.

21. A belt tensioning construction for automatically tensioning an endless belt of a drive system for vehicle accessories, said tensioner construction including:

(a) a support base adapted to be mounted on a vehicle adjacent the drive belt, said base having an upstanding arcuate-shaped wall;

(b) lever means pivotally mounted on the support base for movement toward and away from the drive belt, said lever means having an upstanding arcuate-shaped housing wall movably mounted outwardly of and adjacent said support base wall;

(c) pulley means rotatably mounted on the lever means and engageably with the drive belt for applying a tensioning force on said belt when the lever means is biased in a belt-tensioning direction toward the drive belt;

(d) coil spring means acting between the support base and lever means for biasing the lever means in the belt tensioning direction, said spring means being located radially inwardly from the support base wall; and (e) an arcuate-shaped bearing strip of plastic material located between the lever means housing wall and the support base wall and radially outside the spring means to provide a bearing surface on which the lever means *pivots and* rotates upon movement of the lever means towards and away from the drive belt and to provide maximum frictional damping for the lever means.

* * * * *